US006816676B2

(12) United States Patent
Bianchi et al.

(10) Patent No.: US 6,816,676 B2
(45) Date of Patent: Nov. 9, 2004

(54) ADAPTIVE CONTROL OF LCD DISPLAY UTILIZING IMAGING SENSOR MEASUREMENTS

(75) Inventors: Mark John Bianchi, Fort Collins, CO (US); Amy E Battles, Windsor, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/125,488

(22) Filed: Apr. 19, 2002

(65) Prior Publication Data

US 2003/0198466 A1 Oct. 23, 2003

(51) Int. Cl.[7] .............................................. G03B 17/18
(52) U.S. Cl. .................. 396/282; 396/289; 348/333.01
(58) Field of Search .......................... 359/158; 396/201, 396/232, 281, 282, 287, 289; 348/333.01

(56) References Cited

U.S. PATENT DOCUMENTS

| 5,432,578 A | * | 7/1995 | Suzuki ........................ 396/281 |
| 5,572,283 A | * | 11/1996 | Wakabayashi et al. ...... 396/279 |
| 6,069,449 A | * | 5/2000 | Murakami ................... 315/158 |

* cited by examiner

*Primary Examiner*—David Gray
*Assistant Examiner*—Arthur A Smith

(57) ABSTRACT

A method and arrangement of controlling the attributes of a camera display is disclosed. The method and arrangement obtain information relating to a scene and detect a sensitivity value associated with a camera. Using this information, at least a brightness of the camera display associated with the camera is controlled in accordance with the obtained information and the detected sensitivity value.

28 Claims, 2 Drawing Sheets

ADAPTIVE CONTROL OF LCD DISPLAY UTILIZING IMAGING SENSOR MEASUREMENTS

BACKGROUND OF THE INVENTION

1. Field of the Invention

The present invention relates to methods and arrangements for controlling brightness, contrast and/or backlighting levels of camera image displays, in particular, methods and arrangements for controlling brightness, contrast and/or backlighting levels of camera image displays without the use of ambient light sensors.

2. Related Art

Conventional silver halide and digital cameras that employ the use of electric viewfinders to display images require the use of ambient light sensors to control the brightness, contrast and/or backlighting levels of the viewfinders. These viewfinders are often of the liquid crystal display (LCD) type. For example, when LCDs are viewed at certain ambient brightness levels, these displays may be difficult to read. Therefore, ambient light sensors are used to control the amount of backlighting and/or contrast applied to the display in order to make them easier to view.

Normally, such an ambient light sensor is mounted next to the LCD and detects the amount of ambient light that strikes thereon. Alternatively, the sensor may be located somewhere other than next to the LCD, but it should be in the vicinity of the LCD. Upon detection of an ambient lighting situation that may cause difficult viewing of the LCD, the ambient light sensor sends instructions to a controlling mechanism that adjusts the brightness, contrast and/or backlighting levels accordingly for easier viewing of the LCD.

Manual adjustment of LCDs is also used to compensate the brightness, contrast and/or backlighting levels. Such manual adjustment is done using a dedicated adjustment knob or through a "soft" adjustment accessed though the camera's graphical user interface (GUI).

SUMMARY OF THE INVENTION

A method and arrangement have been created that eliminate the use of ambient light sensors and manual adjustors to control the brightness, contrast and/or backlighting levels of LCDs employed on cameras. In particular, using existing components of conventional digital cameras it is possible to make adjustments in the brightness, contrast and/or backlighting levels of camera LCDs.

Specifically, the camera's exposure information is obtained using built-in auto-exposure algorithms in order to determine a scene's brightness level. This brightness level is then used as an approximation for the ambient brightness level. For most picture-taking situations, this is a reasonable approximation. Then, using the determined level, an empirically determined table of known brightness values that are associated with typical ambient lighting conditions is referenced. Using the known brightness values as a reference, the brightness, contrast and/or backlighting levels of the LCD are controlled.

Additional features and advantages of the invention will be more fully apparent from the following detailed description of the preferred embodiments, the appended claims and the accompanying drawings.

DETAILED DESCRIPTION OF THE PREFERRED EMBODIMENTS

Figure 1:
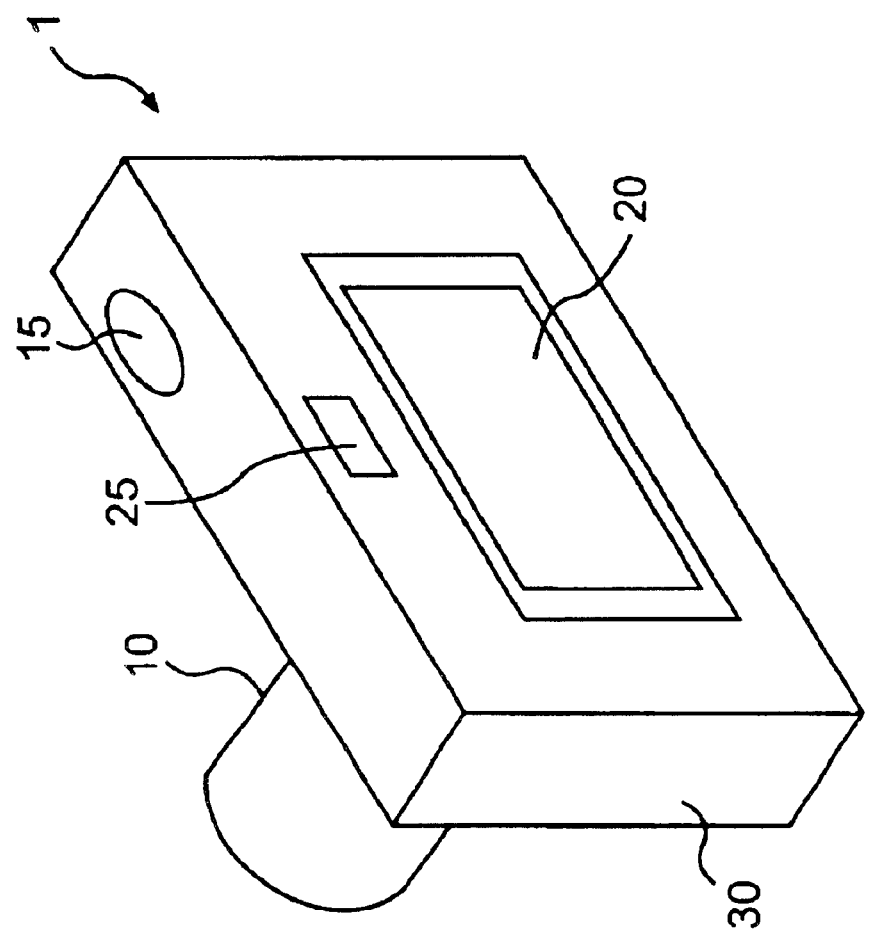
FIG. 1 is a rear perspective view of a digital camera in accordance with the present invention.

FIG. 1 is a rear perspective view of a digital camera 1 in accordance with the present invention. The camera 1 includes a lens 10 that is attached to a front of the digital camera 1. The camera 1 includes a camera body 30 that has a camera actuating button 15, an LCD display 20 and a viewfinder 25. The LCD display 20 may be manipulated for brightness and contrast, and/or the LCD display 20 may employ a backlighting mechanism. Additionally, this backlighting mechanism may employ technology for controlling illumination strength. A typical technology for controlling the brightness is to pulse-width modulate (PWM) the backlight's enable signal. In this way, the illumination can be set from 100% (fully on) to 0% (fully off).

Figure 2:
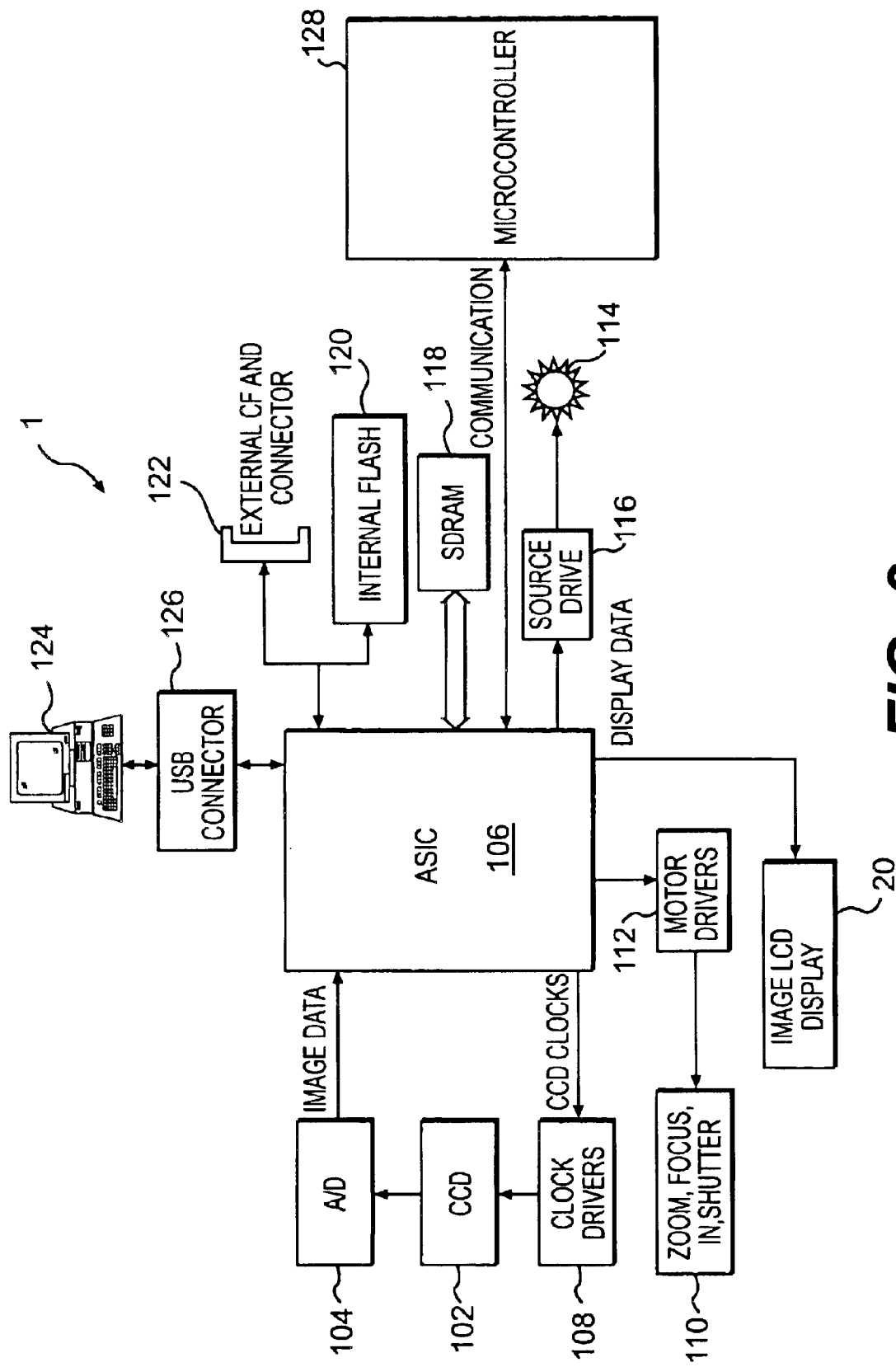
FIG. 2 is a block diagram of the architecture of a digital camera according to the present invention.

FIG. 2 is a block diagram of the architecture of the digital camera 1 according to the present invention. The digital camera 1 of FIG. 1 includes a charge-coupled-device (CCD) 102 that provides an analog signal to an analog-to-digital (A/D) converter 104, and the A/D converter 104 provides digitized output of the CCD 102 to an application-specific integrated circuit (ASIC) 106. The ASIC 106 provides clock signals to clock drivers 108 that are used to operate the CCD 102.

The camera 1 also includes: zoom, focus, iris and shutter mechanisms 110 that are operated via motor drivers 112 by the ASIC 106; and a strobe unit 114 operated via a strobe drive 116 controlled by the ASIC 106. As for memory devices, the digital camera 1 includes: a volatile memory, namely a synchronous dynamic random access memory (SDRAM) device 118; and a non-volatile memory, namely internal flash memory device 120, plus a connector 122 for connection to an external removable non-volatile memory device. The ASIC 106 can also connect to an external workstation 124, typically through a Universal Serial Bus (USB) connector 126.

The digital camera 1 also includes a microcontroller 128 with which the ASIC 106 can communicate. The microcontroller 128 may communicate with a power supply source, user interface, or the like.

Other architectures for the camera are contemplated. Each such architecture can include one or more processors, one or more volatile memory devices and one or more non-volatile memory devices. Moreover, although the present invention is described above and hereinafter in connection with a digital camera, it is clear to those in the art that the present invention may also be practiced with silver halide cameras and the like.

The CCD 102, in addition to other responsibilities, is capable of measuring an exposure value (EV) of a prospectively photographed scene. In particular, when a user of the digital camera 1 prepares to take a picture of a scene, a trial exposure is made whereby the CCD 102 is exposed to the scene for a certain length of time, usually with an aperture opening of the lens 10 being at its widest position. The CCD 102 then sends the scene information to the ASIC 106 where the data is interpreted using exposure algorithms.

The interpretation performed varies greatly from camera to camera and is very scene-dependent. The variations usually involve what part or parts of the scene to include, what influence the parts have in the overall interpretation, and what the desired interpretation should be. In any event, the general goal of an exposure algorithm is to select an EV that causes the majority of the scene's brightness range to fall within CCD's 102 response range. The exposure algorithm is able to determine the scene's EV from the following physical relationship:

$$EV = \log_2(aperture*aperture) + \log_2(1/shutterspeed).$$

The exposure algorithm examines the trial exposure's scene information to determine if the majority thereof is contained within the CCD's 102 response range. If it is not, the exposure algorithm will require a new trial exposure with the aperture or shutter speed (or both) appropriately adjusted from the previous trial exposure. In this way, the exposure algorithm is able to determine the correct or optimum EV for a given scene.

Another value determined when the digital camera 1 is preparing to take a picture of a scene is a sensitivity value (SV). The SV is determined in accordance with an ISO value. In a silver halide camera, this SV is associated with the type of film used (ISO 100, 200, etc.). In digital cameras, the ISO value is known and is either set automatically by the camera or by the operator. Nonetheless, the SV is calculated using the following formula:

$$SV = \log_2(ISOspeed/3.125).$$

The ASIC 106 processes the SV calculation using its exposure algorithms.

Once EV and SV are known, a brightness value (BV) may be determined. The BV will be used, at least in part, to control a relevant brightness, contrast or backlighting level of the LCD display 20. The BV is determined using the following formula of the exposure algorithms:

$$BV = (EV - SV).$$

As mentioned hereinabove, the determined BV may be used to control the brightness, contrast and/or backlighting levels of the LCD display 20. In one embodiment of the present invention, this is accomplished using an empirically determined lookup table that is stored in the non-volatile memory 120. Therefore, when a user prepares to take a picture of a scene using the button 15, the EV and the SV are used to determine the BV. Once the BV is known, the lookup table is referenced in the non-volatile memory 120 and a command(s) is sent thereby to the LCD display 20, via the ASCI 106, for setting the brightness, contrast and/or backlighting. In particular, the determined BV is compared with predetermined BV values stored in the lookup table. If the determined BV has an equal match in the lookup table, then brightness, contrast and/or backlighting may be adjusted in the LCD display 20 in accordance with the brightness, contrast and/or backlighting values associated with the match. However, should the determined BV not have an exact predetermined BV value listed in the table, then the closest predetermined BV value and its associated brightness, contrast and backlighting values may be used to control the LCD display 20. An example of such a stored table is shown in TABLE 1.

TABLE 1

| Typical Scene Condition | BV Value | LCD Backlight Value | LCD Brightness Value | LCD Contrast Value |
|---|---|---|---|---|
| Snow in sunlight | 12 | 100% | 180 | 100 |
| | 11 | 100% | 180 | 100 |
| | 10 | 100% | 170 | 90 |

TABLE 1-continued

| Typical Scene Condition | BV Value | LCD Backlight Value | LCD Brightness Value | LCD Contrast Value |
|---|---|---|---|---|
| Bright outdoors | 9 | 100% | 170 | 80 |
| | 8 | 100% | 160 | 80 |
| | 7 | 100% | 160 | 80 |
| | 6 | 100% | 160 | 80 |
| Cloudy day | 5 | 100% | 155 | 80 |
| | 4 | 80% | 150 | 80 |
| Bright indoors | 3 | 80% | 145 | 80 |
| | 2 | 80% | 140 | 80 |

Control of the LCD display 20 is performed by the ASIC 106. Typically, LCD's contain a controller integrated circuit (IC) for adjusting various aspects of the display. For example, this IC may provide control of brightness, contrast, tint, color, and gamma. When the BV has been determined and the lookup table referenced, the ASIC 106 sends control values to the LCD display 20 to control the brightness, contrast and backlighting attributes of the LCD display 20. The LCD Backlight Value represents the duty cycle with which the LCD display 20 should PWM its backlight. The LCD Brightness Value and the LCD Contrast Value are typical control values that can be sent to the LCD's controller IC to modify the appearance of the LCD display 20.

The lookup table and its associated values are merely an example of a manner of implementing an embodiment of the present invention. As is readily apparent to those skilled in the art, other associated values may be stored in a lookup table for controlling an LCD or the like. In particular, should a specific display type require other values than those shown in TABLE 1 to control the brightness, contrast and/or backlighting levels thereof, one of skill in the art would readily understand the need to modify the associated values accordingly to achieve the desired control of the display.

The above description of the present invention relates to controlling the brightness/contrast levels of the LCD display 20 and its backlight illumination as a user is preparing to take a picture of a scene. However, the present invention may also be used when a user is operating the digital camera 1 in "view" mode. That is, when a user desires to view pictures stored in removable memory or the like.

As the user begins the process of accessing pictures stored in memory, the digital camera automatically runs the exposure algorithms that determine EV, SV and BV. Then, using the process discussed hereinabove, the lookup table is referenced and a command(s) is sent thereby to the LCD display 20 for setting the brightness, contrast and/or backlighting thereof.

Although the non-volatile memory 120 is disclosed as the storage medium for the lookup table in accordance with the present invention, any memory or processing device having storage capabilities may be used to store the lookup table as desired by the implementation requirements of a given camera.

Although the present invention is discussed in conjunction with the use of a lookup table, other possible embodiments of the present invention may use other technologies for storing and retrieving brightness, backlighting and/or contrast information.

For example, in an alternative embodiment of the present invention, the reference BV values with associated brightness, contrast, and/or backlighting levels for controlling the LCD display 20 may be arbitrarily stored in a storage medium for reference. Once a BV is determined by the digital camera's 1 exposure algorithm, it may be compared with the arbitrarily stored BV reference values. The process will choose the closest stored BV and use its associated brightness, contrast, and/or backlighting levels to adjust the LCD display 20.

Additionally, an algorithm or mathematical formula that relates optimum or desired brightness, contrast and/or backlighting levels of the LCD display 20 to measured BV values could be employed.

In yet another advantageous embodiment of the present invention, a reference BV value is used instead of a lookup table. As disclosed hereinabove, the BV value is determined from the EV and SV, but instead of comparing the BV value with a plurality of predetermined BV values stored in a lookup table, only one reference BV value stored in a memory is used to make a decision as to how the LCD display 20 is controlled. This one reference BV value may be stored in the non-volatile memory 120, or the like.

An example of the type of LCD display 20 control that is possible when the reference BV value is used will now be described. Foremost, the BV value is compared to the reference BV value. The BV value is one of equal, greater or less than the reference BV value. If the BV value is greater than the reference BV value then the backlighting of the LCD display 20 is increased a predetermined amount. As an example, the LCD display 20 may be set to 100% backlighting, or the like. Other percentages are also possible as desired. On the other hand, if the BV value is less than the BV reference value, then the LCD display 20 is decreased to a predetermined amount. As an example, the LCD display 20 may be set to 80% backlighting, or the like. Other percentages are also possible as desired. If the BV value is equal to the BV reference value then backlighting may or may not need adjusting according to implementation requirements. Control of the LCD display 20 is accomplished through the ASIC 106.

Although backlighting control has been discussed specifically with respect to this embodiment, other LDC display 20 attributes may be controlled using the same BV value and BV reference value comparison (e.g., brightness, contrast, etc.).

Moreover, although the present invention has been described in conjunction with adjustment of brightness/contrast and backlighting levels of the LCD display 20, the present invention is not limited to adjusting just those attributes of the LCD display 20. Clearly, the lookup table may be modified to include control values relating to color, hue, etc. That is, each reference BV could include a controlling variable that would control the mentioned attributes of the LCD display 20.

Of course, although several variances of the present invention are discussed herein, it is readily understood by those of ordinary skill in the art that various additional modifications may also be made to the present invention. Accordingly, the embodiments discussed herein are not limiting of the present invention.

What is claimed:

1. A method of controlling attributes of a scene-renderable camera-display device, comprising:
   obtaining information relating to a scene;
   detecting a sensitivity value associated with a camera;
   providing the scene-renderable camera-display with image data; and
   controlling, separately from the step of providing with image data, at least a brightness of the scene-renderable camera-display device in accordance with the obtained information and the detected sensitivity value.

2. The method according to claim 1, wherein the information obtained relating to the scene is an exposure value.

3. The method according to claim 1, wherein the sensitivity value is an ISO value.

4. The method according to claim 1, wherein a contrast and a backlighting of the scene-renderable camera-display device are controlled in accordance with the obtained information and the detected sensitivity value.

5. The method according to claim 4, wherein controlling includes calculating a brightness value, and the brightness value is used to control the brightness, contrast and backlighting of the scene-renderable camera-display device.

6. The method according to claim 5, wherein the brightness value is compared to brightness values stored in a lookup table to determine a specific level of brightness, contrast and backlighting applied to the scene-renderable camera-display device.

7. The method according to claim 1, wherein controlling includes calculating a brightness value, and the brightness value is used to control at least the brightness of the scene-renderable camera-display device.

8. The method according to claim 7, wherein the brightness value is compared to brightness values stored in a lookup table to determine a specific level of brightness applied to the scene-renderable camera-display device.

9. The method according to claim 1, wherein controlling comprises:
   calculating a brightness value using the obtained information relating to the scene and the detected sensitivity value; and
   comparing the calculated brightness value with reference brightness values stored in a lookup table to control the brightness of the scene-renderable camera-display device.

10. The method according to claim 1, wherein controlling comprises:
    calculating a brightness value using the obtained information relating to the scene and the detected sensitivity value; and
    comparing the calculated brightness value with reference brightness values stored in a lookup table to control the brightness and a contrast and backlighting of the scene-renderable camera-display device.

11. The method of claim 1, wherein:
    the information relating to a scene is an exposure value;
    the camera includes an imager; and
    the step of obtaining information includes
       making a trial exposure image of a prospectively-photographed scene via the imager, and
       operating upon the trial exposure image to determine the exposure value.

12. The method of claim 1, wherein the step of controlling controls the brightness to take one of at least three levels of brightness.

13. The method of claim 1, wherein the obtained information relates to optical characteristics of the scene.

14. The method of claim 1, wherein the image data is an electronic representation of one of the scene to which the obtained information relates and a different scene.

15. A method of controlling attributes of a scene-renderable camera-display device, comprising:
    obtaining information relating to optical characteristics of a scene;
    detecting a sensitivity value associated with a camera; and
    controlling at least a backlighting of the scene-renderable camera-display device in accordance with the obtained information and the detected sensitivity value.

16. The method according to claim 15, wherein controlling comprises:
    calculating a brightness value using the obtained information relating to the scene and the detected sensitivity value; and
    comparing the calculated brightness value with a reference brightness value to control the backlighting of the scene-renderable camera-display device.

17. The method according to claim 16, wherein if the calculated brightness value is greater than the reference brightness value, the backlighting of the scene-renderable camera-display device is changed by a first percentage, and if the calculated brightness value is less than the reference brightness value, the backlighting of the scene-renderable camera-display device is changed by a second percentage.

18. The method of claim 15, wherein:
    the information relating to a scene is an exposure value;
    the camera includes an imager; and
    the step of obtaining information includes
        making a trial exposure image of a prospectively-photographed scene via the imager, and
        operating upon the trial exposure image to determine the exposure value.

19. The method of claim 15, wherein the step of controlling controls the brightness level to take one of at least three values.

20. The method of claim 15, further comprising:
    providing the scene-renderable camera-display device with data;
    wherein the step of controlling controls the backlighting separately from the step of providing with image data.

21. The method of claim 20, wherein the image data is an electronic representation of one of the scene to which the obtained information relates and a different scene.

22. A camera comprising:
    an imager to obtain information relating to a scene;
    a scene-renderable camera-display device; and
    a controller operable to
        provide the scene-renderable camera-display device with image data,
        detect a sensitivity value associated with the camera, and
        control, separately from the providing with image data, at least a brightness of the scene-renderable camera-display device based upon the obtained information and the detected sensitivity value.

23. The camera according to claim 22, further comprising:
    a lookup table relating a plurality of reference brightness level to at least one of associated predetermined display backlighting values, brightness values and contrast values, respectively;
    wherein the controller is operable to control the brightness of the scene-renderable camera-display device based upon relationships represented by the look up table.

24. The camera of claim 22, wherein:
    the controller element is further operable to
    cause a trial exposure image to be made of a prospectively-photographed scene via the imager, and
    determine exposure information based upon the trial exposure image.

25. The camera of claim 22, further comprising:
    a backlight unit to illuminate the scene-renderable camera-display device;
    wherein the controller is operable to control the brightness of the scene-renderable camera-display device by controlling output intensity of the backlight unit.

26. The camera of claim 25, wherein the controller is further operable to cause the backlight unit to take one of at least three levels of output intensity.

27. The camera of claim 22, wherein the obtained information relates to optical characteristics of the scene.

28. The camera of claim 22, wherein the image data is an electronic representation of one of the scene to which the obtained information relates and a different scene.

* * * * *